United States Patent
Misra et al.

(10) Patent No.: US 11,667,301 B2
(45) Date of Patent: *Jun. 6, 2023

(54) SYMBOLIC MODELING AND SIMULATION OF NON-STATIONARY TRAFFIC OBJECTS FOR TESTING AND DEVELOPMENT OF AUTONOMOUS VEHICLE SYSTEMS

(71) Applicant: Perceptive Automata, Inc., Somerville, MA (US)

(72) Inventors: Kshitij Misra, Cambridge, MA (US); Samuel English Anthony, Cambridge, MA (US)

(73) Assignee: Perceptive Automata, Inc., Boston, MA (US)

( * ) Notice: Subject to any disclaimer, the term of this patent is extended or adjusted under 35 U.S.C. 154(b) by 249 days.

This patent is subject to a terminal disclaimer.

(21) Appl. No.: 16/709,788

(22) Filed: Dec. 10, 2019

(65) Prior Publication Data
US 2020/0247432 A1    Aug. 6, 2020

Related U.S. Application Data

(60) Provisional application No. 62/777,744, filed on Dec. 10, 2018.

(51) Int. Cl.
*G01C 22/00* (2006.01)
*G05D 1/00* (2006.01)
(Continued)

(52) U.S. Cl.
CPC ........ *B60W 50/0097* (2013.01); *B60W 40/04* (2013.01); *B60W 60/0011* (2020.02);
(Continued)

(58) Field of Classification Search
CPC ............ B60W 50/0097; B60W 40/04; B60W 60/0011; B60W 60/0015; B60W 2554/00;
(Continued)

(56) References Cited

U.S. PATENT DOCUMENTS 9,481,366 B1 * 11/2016 Gordon ................ G05D 1/0088
10,496,766 B2    12/2019 Levinson et al.
(Continued)

OTHER PUBLICATIONS

United States Office Action, U.S. Appl. No. 16/709,790, filed Jan. 25, 2022, 27 pages.

*Primary Examiner* — Harry Y Oh
*Assistant Examiner* — Sohana Tanju Khayer
(74) *Attorney, Agent, or Firm* — Fenwick and West LLP

(57) ABSTRACT

A system performs modeling and simulation of non-stationary traffic entities for testing and development of modules used in an autonomous vehicle system. The system uses a machine learning based model that predicts hidden context attributes for traffic entities that may be encountered by a vehicle in traffic. The system generates simulation data for testing and development of modules that help navigate autonomous vehicles. The generated simulation data may be image or video data including representations of traffic entities, for example, pedestrians, bicyclists, and other vehicles. The system may generate simulation data using generative adversarial neural networks.

19 Claims, 11 Drawing Sheets

(51) Int. Cl.
*B60W 50/00* (2006.01)
*B60W 40/04* (2006.01)
*B60W 60/00* (2020.01)
*G06N 3/08* (2023.01)
*G08G 1/01* (2006.01)
*G06V 20/56* (2022.01)

(52) U.S. Cl.
CPC ....... *B60W 60/0015* (2020.02); *G05D 1/0088* (2013.01); *G06N 3/08* (2013.01); *G06V 20/56* (2022.01); *G08G 1/0125* (2013.01); *G08G 1/0145* (2013.01); *B60W 2554/00* (2020.02); *G05D 2201/0213* (2013.01)

(58) Field of Classification Search
CPC ......... G05D 1/0088; G05D 2201/0213; G06K 9/00791; G06N 3/08; G08G 1/0125; G08G 1/0145
See application file for complete search history.

(56) References Cited

U.S. PATENT DOCUMENTS

| | | | |
|---|---|---|---|
| 10,671,076 B1* | 6/2020 | Kobilarov | G08G 1/166 |
| 11,025,865 B1* | 6/2021 | Medasani | H04N 7/181 |
| 2010/0104678 A1 | 4/2010 | Khandros et al. | |
| 2015/0081606 A1 | 3/2015 | Zhao et al. | |
| 2016/0224027 A1* | 8/2016 | Yamamoto | B60W 30/09 |
| 2017/0153639 A1* | 6/2017 | Stein | G06K 9/00805 |
| 2017/0259753 A1* | 9/2017 | Meyhofer | H04N 13/204 |
| 2017/0295446 A1* | 10/2017 | ThagadurShivappa | G06F 3/167 |
| 2017/0316333 A1* | 11/2017 | Levinson | B60W 60/00274 |
| 2017/0329332 A1* | 11/2017 | Pilarski | B60W 30/0956 |
| 2017/0334459 A1* | 11/2017 | McNew | B60W 50/14 |
| 2018/0096605 A1* | 4/2018 | Bai | G08G 1/161 |
| 2018/0137463 A1* | 5/2018 | Mattingly | G05D 1/0276 |
| 2018/0173237 A1* | 6/2018 | Reiley | B60Q 1/46 |
| 2018/0173971 A1 | 6/2018 | Jia et al. | |
| 2018/0236993 A1* | 8/2018 | Mielenz | G08G 1/164 |
| 2018/0268283 A1 | 9/2018 | Gilad-Bachrach et al. | |
| 2018/0276986 A1* | 9/2018 | Delp | B60K 35/00 |
| 2018/0326982 A1* | 11/2018 | Paris | B60W 30/18154 |
| 2019/0018415 A1* | 1/2019 | Netter | B60W 50/0097 |
| 2019/0130594 A1* | 5/2019 | Seyfi | G06K 9/00677 |
| 2019/0332459 A1 | 10/2019 | Schie et al. | |
| 2020/0012285 A1* | 1/2020 | Delp | G08G 1/166 |
| 2020/0104678 A1 | 4/2020 | Nixon et al. | |
| 2020/0211395 A1* | 7/2020 | Feist | B60W 60/00274 |
| 2021/0221405 A1* | 7/2021 | Zhu | G06V 40/10 |

* cited by examiner

SYMBOLIC MODELING AND SIMULATION OF NON-STATIONARY TRAFFIC OBJECTS FOR TESTING AND DEVELOPMENT OF AUTONOMOUS VEHICLE SYSTEMS

CROSS-REFERENCE TO RELATED APPLICATIONS

This application claims the benefit of U.S. Provisional Application 62/777,744 filed Dec. 10, 2018, which is hereby incorporated by reference in its entirety.

GOVERNMENT SUPPORT STATEMENT

This invention was made with government support under Award No. 1738479 awarded by National Science Foundation's Division of Industrial Innovation and Partnerships (IIP). The government has certain rights in the invention.

TECHNICAL FIELD

The present disclosure relates generally to predicting motion of non-stationary objects encountered by an autonomous vehicle in the traffic and more specifically to modeling and simulation of non-stationary traffic objects for testing and development of autonomous vehicle systems.

BACKGROUND

An autonomous vehicle uses sensors to receive input describing its surroundings and uses the sensor data to navigate through traffic. Conventional techniques for navigating an autonomous vehicle predict motion of non-stationary objects using kinematics. For example, an autonomous vehicle may predict "motion vectors" of people near the vehicles to determine how to navigate the autonomous vehicle. The autonomous vehicle may collect data describing a pedestrians current and past movements, determine a motion vector of the person at a current time based on these movements, and extrapolate a future motion vector representing the person's predicted motion at a future time based on the current motion vector.

These techniques fail to predict motion of certain non-stationary objects for example, pedestrians, bicyclists, and so on. For example, if the autonomous vehicle detects a pedestrian standing in a street corner, the motion of the pedestrian does not help predict whether the pedestrian will cross the street or whether the pedestrian will remain standing on a street corner. Similarly, if the autonomous vehicle detects a bicyclist in a lane, the current motion of the bicycle does not help the autonomous vehicle predict whether the bicycle will change lanes. Failure of autonomous vehicles fail to accurately predict motion of non-stationary traffic objects results in unnatural movement of the autonomous vehicle, for example, as a result of the autonomous vehicle suddenly stopping due to a pedestrian moving in the road or the autonomous vehicle continuing to wait for a person to cross a street even if the person never intends to cross the street.

Furthermore, the modules used by autonomous vehicles are tested and developed using simulation and modeling techniques that create scenarios that may be difficult or rare to encounter in a real scenario. For example, a simulation system can create scenarios where other vehicles move dangerously close to the autonomous vehicle to test whether the autonomous vehicle is safely able to navigate through these situations. Conventional simulation techniques do not generate sufficient scenarios that include pedestrians and bicyclists that pose a high risk of collision with the autonomous vehicle without having a motion trajectory that indicates a likelihood of collision.

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
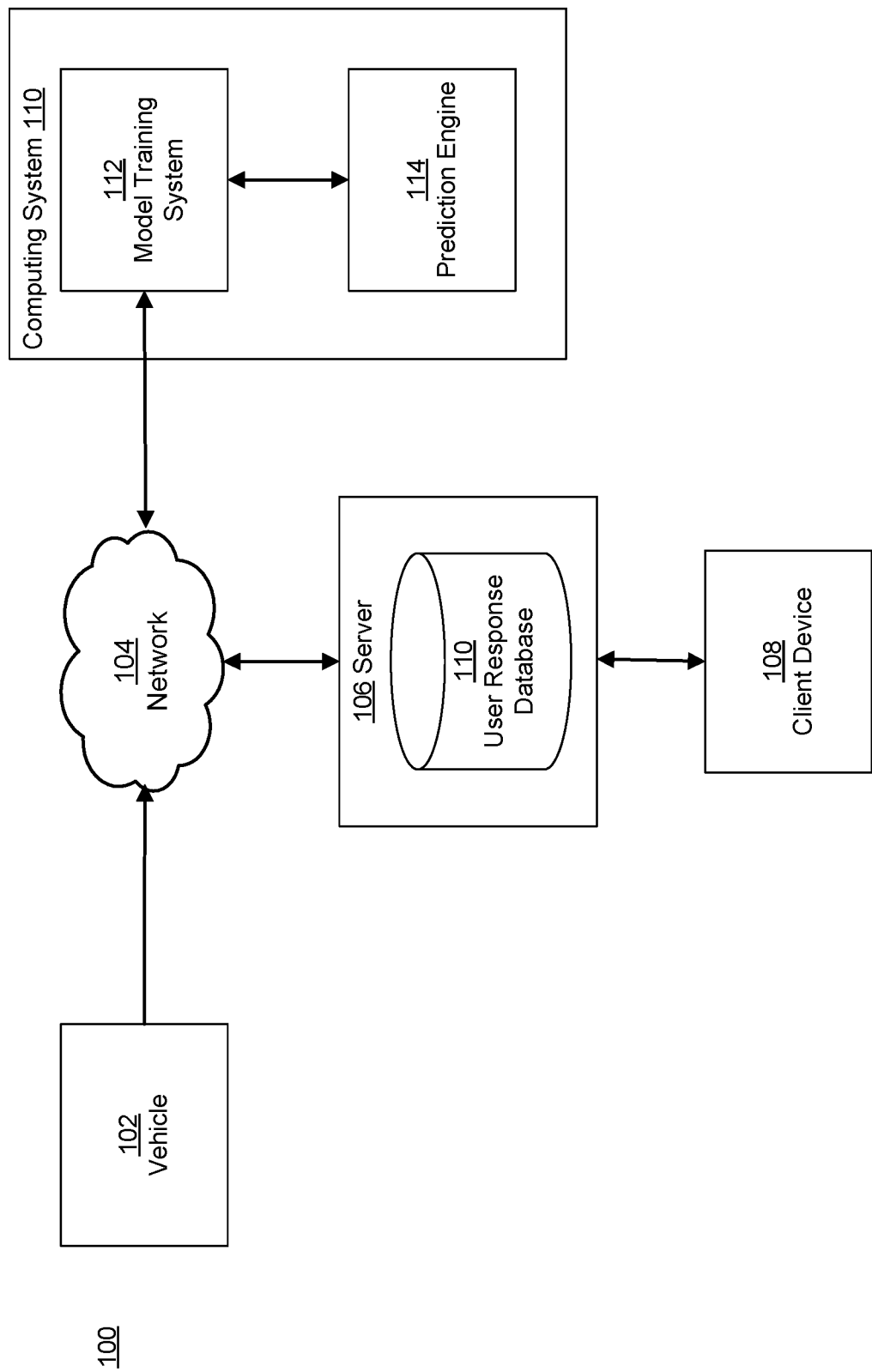
FIG. 1 is a diagram of the system environment for predicting hidden context describing non-stationary traffic entities, according to some embodiments.

An autonomous vehicle uses sensors to receive input describing its surroundings while driving through traffic. For example, an autonomous vehicle may perceive the surroundings using camera images and lidar scans. The autonomous vehicle determines whether an object in the surroundings is stationary or non-stationary. Examples of stationary objects that may be perceived by an autonomous vehicle include buildings, trees, and traffic signs. Examples of non-stationary objects perceived by an autonomous vehicle include pedestrians, bicyclists, vehicles, and so on. The autonomous vehicle system predicts the motion of non-stationary objects for safely navigating through the traffic.

The autonomous vehicle analyzes the behavior of people near a vehicle in a way that more closely resembles how human drivers would analyze the behavior. For example, in one embodiment, a group of users (or human observers)

view sample images of people (such as pedestrians) near streets and/or vehicles and indicate or are measured for their understanding of how they believe the people will behave. These indicators or measurements are then used for training a machine learning based model that predicts how people will behave in a real-world context. In other words, after being trained based on the reactions of human observers to sample images in a training environment, the machine learning based model is able to predict actual pedestrian behavior in a real-world environment. Systems for predicting human interactions with vehicles are disclosed in U.S. patent application Ser. No. 15/830,549, filed on Dec. 4, 2017 which is incorporated herein by reference in its entirety.

A system performs simulation of data processed by modules of an autonomous vehicle. A system generates a representation of surroundings of a vehicle as the vehicle drives through traffic. For example, the system trains a rendering engine to generate simulation data of surroundings using feature vectors describing characteristics of traffic entities in environments through which a vehicle might drive. A traffic entity represents a non-stationary object in the traffic in which the vehicle is driving. A feature vector includes information describing traffic entities in an environment and predefined kinematics and rendering characteristics for the traffic entities.

The system annotates one or more traffic entities displayed in the simulation data, with statistical information describing hidden context of the traffic entity. In an embodiment, the hidden context represents a state of mind of a user represented by the traffic entity, for example, a state of mind of a pedestrian indicating whether the pedestrian wants to cross the street. The hidden context may represent a degree of awareness of the autonomous vehicle by a user represented by the traffic entity, for example, whether a bicyclist is aware of the autonomous vehicle. The hidden context may represent a goal of a user represented by the traffic entity, such that the user expects to achieve the goal within a threshold time interval, for example, in the next few seconds. The statistical information represents an expected distribution of user responses describing hidden context for the traffic entity obtained from users describing the traffic entity.

The system provides the annotated simulation data as input to a motion planner for executing the motion planner in a simulated environment. The motion planner is configured to adjust motion of an autonomous vehicle according to the hidden context of traffic entities encountered by the autonomous vehicle while driving in traffic.

The motion planner is used for navigation of an autonomous vehicle that executes a machine learning based model configured to output a measure of statistical distribution of the hidden context attribute for a traffic entity captured by sensors of the autonomous vehicle, the statistical, distribution representing a distribution of values of the hidden context attribute as reported by a population of users presented with an image of the traffic entity. The machine learning based model is trained using user responses received from users presented with images showing traffic scenarios.

In an embodiment, the autonomous vehicle navigates by generating signals for controlling the autonomous vehicle based on the motion parameters and the hidden context of each of the traffic entities. The generated signals are sent to the controls of the autonomous vehicle.

In one embodiment, the system uses symbolic representation of the traffic entities in the simulation data. Accordingly, the symbolic representation of the annotated traffic entities is stored and may be transmitted to systems that are being tested/developed. The motion planner or any other module of the autonomous vehicles that is being tested/developed receives the annotated symbolic representations of the entities and is tested/developed using the simulation data. The simulation data does not include the images/videos of the traffic entities. Accordingly, the symbolic representation may not be visualized as images or videos from a user's perspective and any module that processes images/videos cannot be tested/developed using the simulation data. However, the symbolic representation can be used to testing/developing modules such as motion planner that directly receives the symbolic representation as input and processes it.

In another embodiment, the system generates videos/images representing the scene that an autonomous vehicle is expected to be driving through in the simulation environment. The system uses a rendering engine to generate images/videos. The rendering engine is configured to receive a feature vector describing various traffic entities as input and render images describing the traffic entities. For example, the feature vector may specify that the traffic entity is a pedestrian, the location of the pedestrian, the orientation indicating the direction that the pedestrian is walking in, the speed with which the pedestrian is moving, and so on. The feature vector also specifies the desired hidden context attributes of the traffic entity, for example, desired state of mind of a pedestrian. The rendering engine generates a traffic entity according to the input feature vector for adding to the scene being generated for the simulation environment. The rendering engine acts as a generative model in a generative adversarial network (GAN). The system uses a machine learning based model as the adversarial network for determining whether the generated image has the desired hidden context attributes. The machine learning based model is configured to a machine learning based model configured to output a measure of statistical distribution of the hidden context attribute for a traffic entity captured by sensors of the autonomous vehicle, the statistical, distribution representing a distribution of values of the hidden context attribute as reported by a population of users presented with an image of the traffic entity. The machine learning based model is used by the motion planner or any other module of the autonomous vehicle for determining values of hidden context attributes of the traffic entities for navigating through traffic including those traffic entities.

In an embodiment, the system compares the predicted hidden context for the simulation data to a desired output, e.g., the hidden context values provided in the input feature vector to the rendering engine. If the hidden context for the simulation data diverges from the desired output, the system perturbs one or more parameters for the feature vector, for example, by resampling the parameter and iterates the process for generating the hidden context attributes based on the simulation data. The system repeats the steps of perturbing the feature vector and verifying the result of the generated simulation data until the desired simulation data is generated.

In an embodiment, the system determines a derivative of the hidden context attribute value being predicted by machine learning based model using the generated simulation data. The derivative value represents a gradient of the feature vector. The system uses gradient descent techniques to determine the direction in which to perturb the feature vector so that the corresponding hidden context attributes change towards the desired values.

System Environment

FIG. 1 is a diagram of the system environment 100 for predicting hidden context describing non-stationary traffic entities, according to some embodiments. The system environment 100 comprises a vehicle 102, a network 104, a server 106, a user response database 110, a client device 108, and a computing system 110 that comprises various components a model training system 112 and a prediction engine 114.

The vehicle 102 is an autonomous vehicle or any type of manual or motorized vehicle such as a car, bus, train, scooter, or bicycle. The vehicle 102 can include sensors for monitoring the environment surrounding the vehicle. In one implementation, the sensors can include a camera affixed to any portion of the vehicle for capturing a video of people near the vehicle.

The network 104 can be any wired and/or wireless network capable of receiving sensor data collected by the vehicle 102 and distributing it to the server 106, the model training system 112, and, through the model training system 112, the prediction engine 114.

The server 106 can be any type of computer system capable of (1) hosting information (such as image, video and text information) and delivering it to a user interface displayed via a client device 108, (2) recording responses of multiple users (or human observers) to the information, and (3) delivering such information and accompanying responses (such as responses input by users via client device 108) back to the network 104.

The user response database 110 can be any type of database or data storage system capable of storing the image, video, and text information and associated user responses and subsequently recalling them in response to a query.

The model training system 112 can be implemented in any type of computing system. In one embodiment, the model training system 112 receives the image, video, and/or text information and accompanying, or linked, user responses from the database 110 over the network 104. In some embodiments, the text segments are discrete values or free text responses. The model training system 112 can use images, video segments and text segments as training examples to train a machine learning based model, and can create labels from the accompanying user responses based on the machine learning based model. These labels indicate how the machine learning based model predicts the behavior of the people in the associated image, video, and/or text segments. After the labels are created, the model training system 112 can transmit them to the prediction engine 144.

The prediction engine 114 can be implemented in any computing system. In an illustrative example, the prediction engine 114 includes a machine learning based model that has been trained by the model training system 112. This machine learning based model is configured to estimate a label for a new (e.g., an actual "real-world") image, video, and/or text segment based on the labels and associated image, video, and/or text segments that it received from the model training system 112. In some embodiments, this label comprises aggregate or summary information about the responses of a large number of users (or human observers) presented with similar image, video, or text segments while the machine learning based model was being trained.

Figure 2:
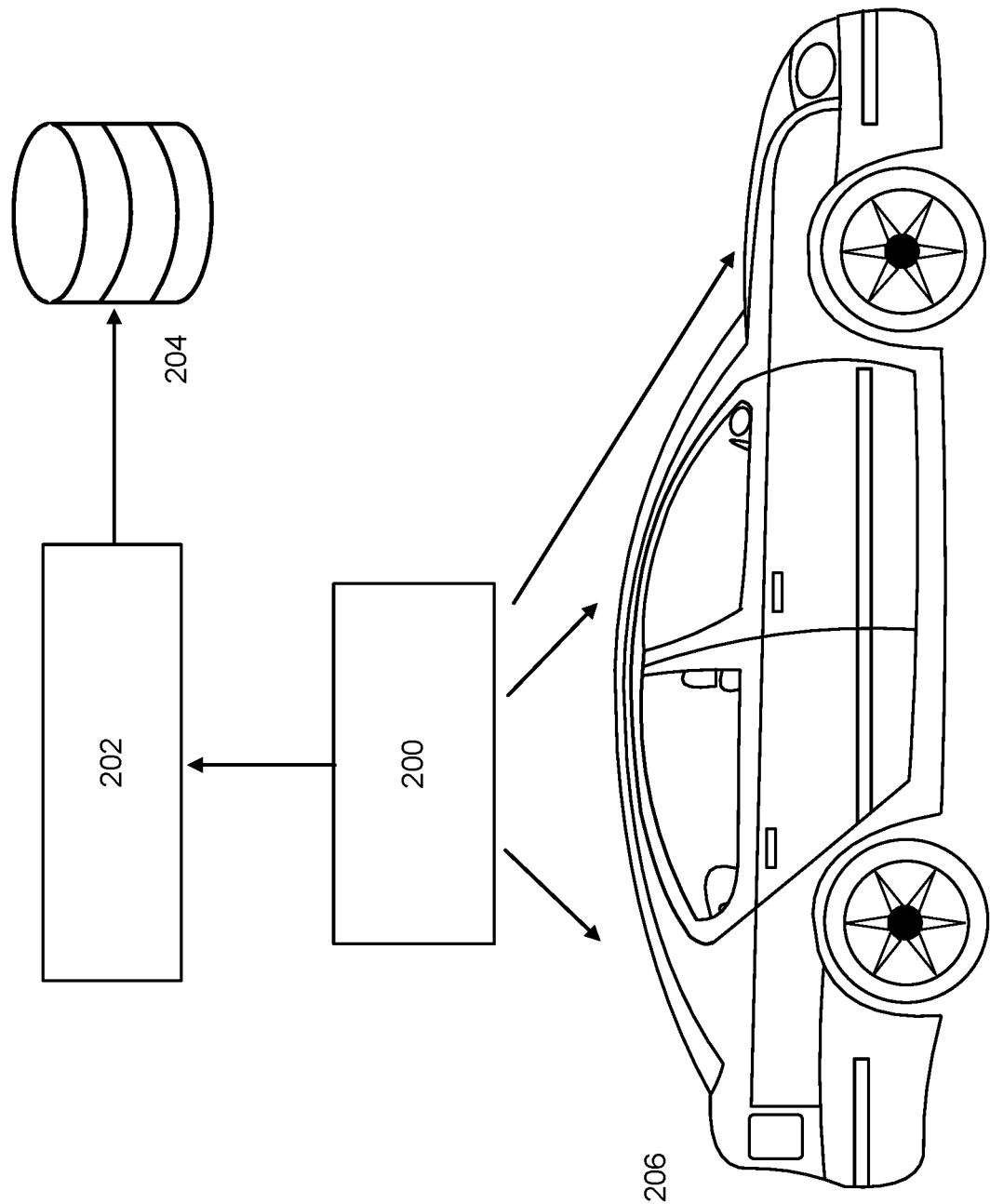
FIG. 2 is a system diagram showing a sensor system associated with a vehicle, according to some embodiments.

FIG. 2 is a system diagram showing a sensor system associated with a vehicle, according to some embodiments. FIG. 2 shows a vehicle 206 with arrows pointing to the locations of its sensors 200, a local processor and storage 202, and remote storage 204.

Data is collected from cameras or other sensors 200 including solid state Lidar, rotating Lidar, medium range radar, or others mounted on the car in either a fixed or temporary capacity and oriented such that they capture images of the road ahead, behind, and/or to the side of the car. In some embodiments, the sensor data is recorded on a physical storage medium (not shown) such as a compact flash drive, hard drive, solid state drive or dedicated data logger. In some embodiments, the sensors 200 and storage media are managed by the processor 202.

The sensor data can be transferred from the in-car data storage medium and processor 202 to another storage medium 204 which could include cloud-based, desktop, or hosted server storage products. In some embodiments, the sensor data can be stored as video, video segments, or video frames.

In some embodiments, data in the remote storage 204 also includes database tables associated with the sensor data. When sensor data is received, a row can be added to a database table that records information about the sensor data that was recorded, including where it was recorded, by whom, on what date, how long the segment is, where the physical files can be found either on the internet or on local storage, what the resolution of the sensor data is, what type of sensor it was recorded on, the position of the sensor, and other characteristics.

The system collects predictions and other information from human observers based on derived stimuli. Human observers are given instructions about how to answer questions about derived stimuli. Those observers are presented with derived stimuli and asked to answer questions about them. The observers respond to the stimuli and those responses are recorded. The recorded responses are aggregated and logged in a database.

Some number of human observers (two or more) are recruited to participate on one or several crowdsourcing websites, such as Amazon's Mechanical Turk or at a physical location provided with a display. The observers are given detailed written and pictorial instructions explaining the task that they are about to complete. These instructions give examples of situations that might be depicted in the derived stimuli, and the kinds of responses that would be appropriate for those situations.

The human observers are shown a display which includes the derived stimulus. The display also includes a mechanism for making a judgment about the stimulus. The mechanism for making the judgment can be a continuous indicator such as a ribbon on which the observer could drag a control to a certain point. The mechanism can also be an ordinal measure such as a Likert scale where the observer can make a judgment about a degree of certainty of the judgment. The mechanism can also be a control that the human observer drags with their mouse to draw a trajectory onscreen indicating a judgment. The mechanism can also be a text entry field where the observer types a description of their judgment. The judgment that the human observer makes is an evaluation of the state of mind of a road user depicted in the derived stimulus. The evaluation can be of the intention, awareness, personality, state of consciousness, level of tiredness, aggressiveness, enthusiasm, thoughtfulness or another characteristic of the internal mental state of the pictured road user. If the ratings collected are on an ordinal scale they can describe the characteristic using language of probability, such as "the other driver may be attentive" or "the other driver is definitely attentive" or "the other driver is definitely not attentive". The ratings of large numbers of human observers are collected. Summary statistics are generated based on the responses of all of the observers who looked at an image. Individual variability in responses to a given stimulus can be characterized in the information given by the observers to the machine learning based model. The summary statistics might include unweighted information from all observers, or might exclude observers based on extrinsic or intrinsic criteria such as the time it took an observer to respond, the geographical location of an observer, the observer's self-reported driving experience, or the observer's reliability in making ratings of a set of other images.

The explicit response of the observer as well as implicit data is recorded. The implicit data can include how long the subject took to respond, if they hesitated in their motions, if they deleted keystrokes, if they moved the mouse anywhere other than the location corresponding to the response they eventually chose, where their eyes moved, or other implicit measures.

The system produces summary statistics of a video frame or derived stimulus. These summary statistics include measurements of the central tendency of the distribution of scores like the mean, median, or mode. They could include measurements of the heterogeneity of the scores like variance, standard deviation, skew, kurtosis, heteroskedasticity, multimodality, or uniformness. They could also include summary statistics like those above calculated from the implicit measurements of the responses listed above.

System Architecture

Figure 3:
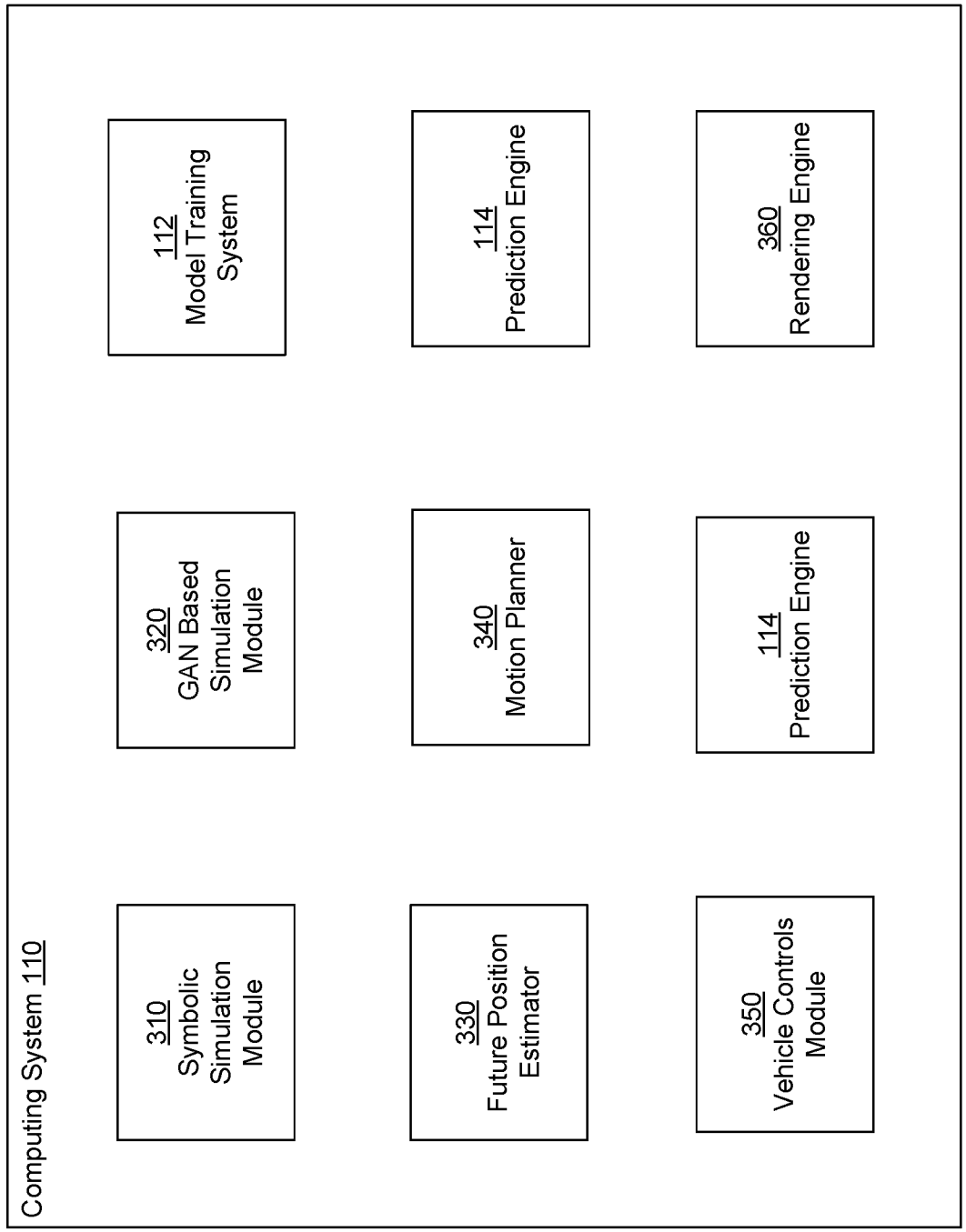
FIG. 3 represents a system architecture of a computing system for performing various tasks associated with autonomous vehicles, according to an embodiment.

FIG. 3 represents a system architecture of a computing system for performing various tasks associated with autonomous vehicles, according to an embodiment. The computing system 300 comprises a symbolic simulation module 310, a GAN based simulation module 320, a future position estimator 330, a motion planner 340, a vehicle controls module 350, and a rendering engine 360. In other embodiments, the computing system 300 can have more or fewer modules than those shown in FIG. 3. Functionality indicated as being performed by a particular module may be performed by other modules than those indicated herein. A computing system may be referred to as the system. However various tasks indicated as being performed by a computing system or a system can be performed by other systems, for example, various systems shown in FIG. 1.

Several modules a future position estimator 330, a motion planner 340, and a vehicle controls module 350 may be tested on a computing system 110 using simulation modules 310 or 320. The tested modules are deployed on a vehicle computing system of an autonomous vehicle. The modules deployed on an autonomous vehicle process data received from sensors of the autonomous vehicle and help navigate the autonomous vehicle.

The sensors of an autonomous vehicle capture sensor data 160 representing a scene describing the traffic surrounding the autonomous vehicle. Examples of sensors used by an autonomous vehicle include cameras, lidars, GNSS (global navigation satellite system such as a global positioning system, or GPS), IMU (inertial measurement unit), and so on. Examples of sensor data includes camera images and lidar scans.

The traffic includes one or more traffic entities, for example, a pedestrian 162. The vehicle computing system 120 analyzes the sensor data 160 and identifies various traffic entities in the scene, for example, pedestrians, bicyclists, other vehicles, and so on. The vehicle computing system 120 determines various parameters associated with the traffic entity, for example, the location (represented as x and y coordinates), a motion vector describing the movement of the traffic entity, and so on.

The future position estimator 125 estimates the future position of a traffic entity. The motion planner 130 determines a plan for the motion of the autonomous vehicle. The vehicle control module 135 sends signals to the vehicle controls (for example, accelerator, brakes, steering, emergency braking system, and so on) to control the movement of the autonomous vehicle. In an embodiment, the future position estimates for a traffic entity determined by the future position estimator 125 based on sensor data 160 are provided as input to the motion planner 130. The motion planner 130 determines a plan for navigating the autonomous vehicle through traffic, and provides a description of the plan to the vehicle control module 135. The vehicle control module 135 generates signals for providing to the vehicle controls. For example, the vehicle control module 135 may send control signals to an emergency braking system to stop the vehicle suddenly while driving, the vehicle control module 135 may send control signals to the accelerator to increase or decrease the speed of the vehicle, or the vehicle control module 135 may send control signals to the steering of the autonomous vehicle to change the direction in which the autonomous vehicle is moving.

In a computing system 110, the modules future position estimator 330, a motion planner 340, and a vehicle controls module 350 receive data from a simulator and generate signals or instructions that may be used by an autonomous vehicle upon deployment. The generate signals or instructions may be provided to a simulator that validates the generated signals or instructions in view of the simulation data. For example, the sensor data generated by the simulator may represent a pedestrian that comes in the navigation path of the simulated autonomous vehicle. The various modules attempt to generate signals to navigate the simulated autonomous vehicle safely without hitting the pedestrian. If the vehicle controls module 350 generates signals that may cause the simulated autonomous vehicle to collide with the pedestrian, the simulator indicates this situation so that the modules can be debugged and further tested to perform safely.

The symbolic simulation module 310 performs symbolic simulation of objects/entities encountered by an autonomous vehicle in traffic, for example, while the autonomous vehicle is driving on a road through traffic. The GAN based simulation module 310 uses generative adversarial networks (GANs) for generating models representing objects/entities encountered by an autonomous vehicle in traffic. The rendering engine 360 receives a feature vector describing a traffic entity as input and generates an image including the traffic entity. The feature vector includes information describing traffic entities in an environment and predefined kinematics and rendering characteristics for the traffic entities. For example, the feature vector may specify that the traffic entity is a pedestrian, the location of the pedestrian, the orientation indicating the direction that the pedestrian is walking in, the speed with which the pedestrian is moving, and so on. The feature vector also specifies the desired hidden context attributes of the traffic entity, for example, desired state of mind of a pedestrian. The rendering engine generates a traffic entity according to the input feature vector for adding to the scene being generated for the simulation environment. The rendering engine acts as a generative model in a generative adversarial network (GAN).

The future position estimator 330 receives sensor data describing a non-stationary object encountered by an autonomous vehicle in traffic and estimates a future position of the moveable object. The motion planner 340 perform planning for the motion of the autonomous vehicle, for example, to ensure that the autonomous vehicle drives to its destination through a safe path, avoiding collisions with stationary or non-stationary objects. Both, the terms motion planners and ADAS (Advanced driver assistance system) are collectively referred to as motion planners herein. A motion planner performs the task of calculating an autonomous vehicle's path in a static or dynamic environment, with static or dynamic actors, which may be human or non-human. The output of such a motion planner is then provided to the vehicle controls module that may actuate motion system including but not limited to the accelerator, brakes, and/or the steering control of the vehicle. Techniques disclosed herein can be used by any robotic systems such as an on-road vehicle, whether fully autonomous or partially automated, or a warehouse robot or an automated forklift.

Training and Execution of Machine Learning Based Model

The system trains a machine learning based model using summary statistics describing user responses provided in response to observing stimuli representing surroundings of a vehicle as the vehicle navigates through traffic. A combination of image and summary statistics comprises a training sample for the machine learning based model. The machine learning based model may be any type of supervised learning based model capable of predicting a continuous label for a two or three dimensional input, including but not limited to a random forest regressor, a support vector regressor, a simple neural network, a deep convolutional neural network, a recurrent neural network, a long-short-term memory (LSTM) neural network with linear or nonlinear kernels that are two dimensional or three dimensional.

The machine learning based model is trained by a process of progressively adjusting the parameters of the machine learning based model in response to the characteristics of the images and summary statistics given to it in the training phase to minimize the error in its predictions of the summary statistics for the training images in step 804. In one embodiment of the model training system 112, the machine learning based model can be a deep neural network. In this embodiment the parameters are the weights attached to the connections between the artificial neurons comprising the network. Pixel data from an image in a training set collated with human observer summary statistics can serve as an input to the network. This input can be transformed according to a mathematical function by each of the artificial neurons, and then the transformed information can be transmitted from that artificial neuron to other artificial neurons in the neural network. The transmission between the first artificial neuron and the subsequent neurons can be modified by the weight parameters discussed above. In this embodiment, the neural network can be organized hierarchically such that the value of each input pixel can be transformed by independent layers (e.g., 10 to 20 layers) of artificial neurons, where the inputs for neurons at a given layer come from the previous layer, and all of the outputs for a neuron (and their associated weight parameters) go to the subsequent layer. At the end of the sequence of layers, in this embodiment, the network can produce numbers that are intended to match the human summary statistics given at the input. The difference between the numbers that the network output and the human summary statistics provided at the input comprises an error signal. An algorithm (e.g., back-propagation) can be used to assign a small portion of the responsibility for the error to each of the weight parameters in the network. The weight parameters can then be adjusted such that their estimated contribution to the overall error is reduced. This process can be repeated for each image (or for each combination of pixel data and human observer summary statistics) in the training set collected. At the end of this process the model is "trained", which in some embodiments, means that the difference between the summary statistics output by the neural network and the summary statistics calculated from the responses of the human observers is minimized.

Figure 4:
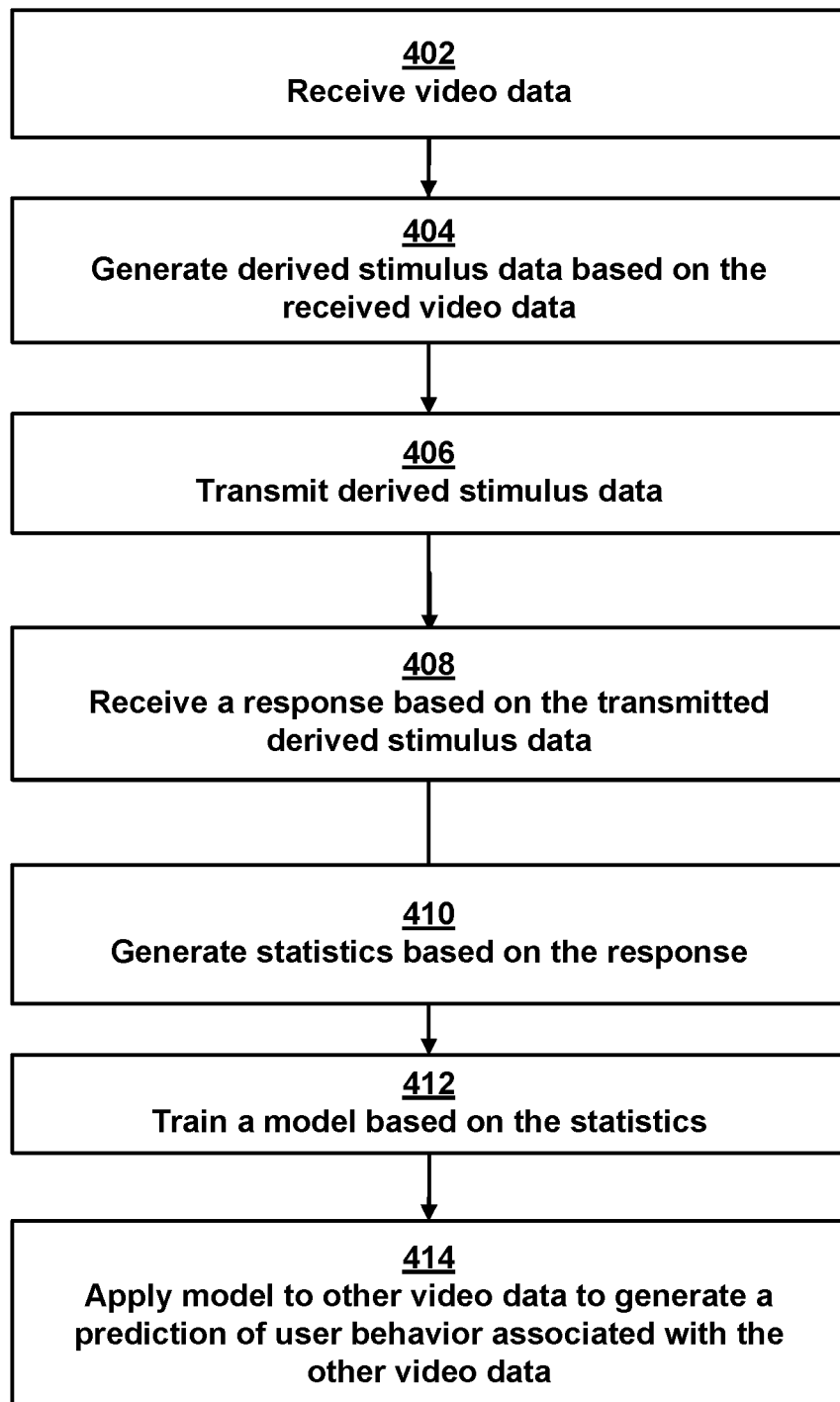
FIG. 4 is a flow chart showing a process of training a machine learning based model for predicting values of hidden context attributes for traffic entities, according to some embodiments.

FIG. 4 is a flow chart showing a process of training a machine learning based model for predicting values of hidden context attributes for traffic entities, according to some embodiments. In one implementation, video or other data is captured by a camera or sensor mounted on the vehicle 102. The camera or other sensor can be mounted in a fixed or temporary manner to the vehicle 102. As the vehicle travels along various streets, the camera or sensor captures still and/or moving images (or other sensor data) of pedestrians, bicycles, automobiles, etc. moving or being stationary on or near the streets. This video or other data captured by the camera or other sensor is transmitted 202 from the vehicle 102, over the network 104, and to the server 106 where it is stored.

The system extracts 204 video frames or segments from the stored video or other data and are used to create stimulus data including derived stimulus (or stimuli). In one implementation, the derived stimulus corresponds to a scene in which one or more humans are conducting activities (e.g., standing, walking, driving, riding a bicycle, etc.) beside or on a street and/or near a vehicle. As explained in more detail below for example in step 414 and in the text accompanying FIG. 9, as part of the training process for the machine learning based model, human observers view the derived stimulus and predict how they believe the humans shown in the derived stimulus will act. In an embodiment, a bounding box may be shown around a traffic entity displayed in the stimulus to identify a traffic entity that is subject of the response requested from a user.

In step 406, the derived stimulus is transmitted from the server 106 and displayed to a large number of users (or human observers) via a user interface displayed via the client device 108. The user interface prompts the human observers to predict how the people shown in the derived stimulus will act, and upon viewing the displayed stimulus, the observers input their responses corresponding to their predictions. For example, the human observers may predict whether a first person in the stimulus will cross the street, whether a person will remain standing on a street corner, or whether another person will change lanes on his or her bicycle. In an illustrative embodiment, the human observers may make a continuous or ordinal judgment about the state of mind or the predicted behavior of the people shown in the derived stimulus and record that judgment. For example, the human observers may select an appropriate icon displayed on a user interface by clicking a mouse or by pressing a key to indicate their judgment or prediction. The judgment or prediction may correspond to the human observers' assessment of the state of mind of the person in the derived stimulus or other awareness or intention that would be relevant to a hypothetical driver who sees the person in the derived stimulus while driving. In step 408, the derived stimulus and associated human observer responses are transmitted from the user interface to the server 106 and recorded in the user response database 110.

In step 410, summary statistics are generated based on the user responses. For example, the statistics may characterize the aggregate responses of multiple human observers to a particular derived stimulus. For instance, if the derived stimulus shows a pedestrian walking on a sidewalk towards an intersection, the response can be categorized in terms of how many human observers believe that the pedestrian will stop upon reaching the intersection, continue walking straight across the intersection, turn a corner and continue walking along the sidewalk without crossing the intersection, etc. These summary statistics can characterize the human observer responses in terms of certain parameters associated with the statistics, such as a content of a response, a time associated with entering a response, and a position of an eye of a human observer associated with the response. The parameters can also be associated with a (1) central tendency, variance, skew, kurtosis, scale, or histogram. For example, the amount of time users took to input their responses can be characterized in terms of central tendency, variance, skew, kurtosis, scale, histogram. Also, the statistics can include a parameter that additionally or alternatively characterizes the movement of the human observers' eyes relative to a display when making the judgments in terms of central tendency, variance, skew, kurtosis, scale, histogram or two-dimensional distribution. In one embodiment, the statistics are stored in the user response database 110 with an index that identifies the raw video or sensor data from which the derived stimulus was generated. In a further embodiment, the statistics stored in the database 110 cover a large set of images of people on or near roads and are categorized in a number of different categories, such as pedestrian, driver, motorcyclist, bicyclist, scooter driver, self-balancing scooter rider, unicyclist, motorized wheelchair user, skateboarder, or others. Moreover, the statistics are respectively stored along with, or linked to, the images of the derived stimuli corresponding to the statistics.

In step 412, the stored statistics and corresponding images (e.g., the video frames or segments that were extracted from the video or other data (captured from the camera or sensor of the vehicle)) are sent over the network 104 to the model training system 112 and used to train a machine learning based model. For example, the collection of images and statistics can be used to train a supervised learning based model, which can comprise a random forest regressor, a support vector regressor, a simple neural network, a deep convolutional neural network, a recurrent neural network, a long-short-term memory (LSTM) neural network with linear or nonlinear kernels that are two dimensional or three dimensional, or any other supervised learning based model which is able to take a collection of data labeled with continuous values and adapt its architecture in terms of weights, structure or other characteristics to minimize the deviation between its predicted label on a novel stimulus and the actual label collected on that stimulus using the same method as was used on the set of stimuli used to train that network. The model is given data which comprises some subset of the pixel data from the video frames that the summary statistics were generated from. In one implementation, this subset includes the pixel data contained in a bounding box drawn to contain the boundaries of the person, cyclist, motorist and vehicle, or other road user, including their mode of conveyance. In some other implementations, it also includes the entire pixel data from the rest of the image. In one of those implementations, that pixel data is selected according to criteria such as the salience of those features in terms of contrast, lighting, presence of edges, or color. In an additional implementation, the features can include descriptive meta-data about the images such as dimensions and location of the bounding box, the shape of the bounding box or the change in size or position of the bounding box from one frame to the next.

In step 414, the prediction engine 114 uses the trained model from the model training system 112 to predict the actual, "real-world" or "live data" behavior of people on or near a road. In one embodiment, the prediction engine 114 receives "live data" that matches the format of the data used to train the trained model. For example, if the trained model was trained based on video data received from a camera on the vehicle 102, the "live data" that is input to the machine learning based model likewise is video data from the same or similar type camera. On the other hand, if the model was trained based on another type of sensor data received from another type of sensor on the vehicle 102, the "live data" that is input to the prediction engine 114 likewise is the other type of data from the same or similar sensor.

The machine learning based model makes a prediction of what a pedestrian or other person shown in the "live data" would do based on the summary statistics and/or training labels of one or more derived stimulus. The accuracy of the model is determined by having it make predictions of novel derived stimuli that were not part of the training images previously mentioned but which do have human ratings attached to them, such that the summary statistics on the novel images can be generated using the same method as was used to generate the summary statistics for the training data, but where the correlation between summary statistics and image data was not part of the model training process. The predictions produced by the trained model comprise a set of predictions of the state of mind of road users that can then be used to improve the performance of autonomous vehicles, robots, virtual agents, trucks, bicycles, or other systems that operate on roadways by allowing them to make judgments about the future behavior of road users based on their state of mind.

Figure 5:
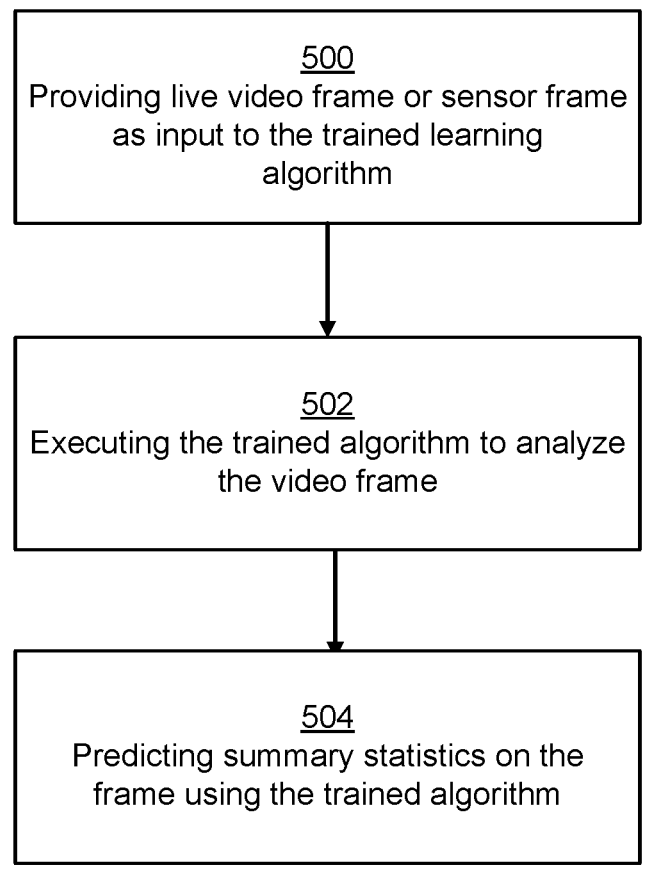
FIG. 5 is a flowchart showing a process of predicting values of hidden context attributes using a trained machine learning based model, according to some embodiments.

FIG. 5 is a flowchart showing a process of predicting values of hidden context attributes using a trained machine learning based model, according to some embodiments.

The "real world" or "live data" video or other sensor frames from a car-mounted sensor are provided 500 as input to the machine learning based model. These frames have the same resolution, color depth and file format as the frames used to train the machine learning based model. These frames are delivered as individual frames or as sequences according to the format used to train the machine learning based model.

The machine learning based model is executed 502 to analyze each of these frames. In one embodiment, the data from the frame that was passed through the model would comprise the pixel data from a camera.

The machine learning based model outputs 504 a number or set of numbers that comprise the predicted summary statistics for the "real world" or "live data" image. The predicted summary statistics are the model's best estimation of what the summary statistics would be on the image if the image had human annotations collected. The prediction is generated automatically by passing the sensor data through the model, where the information is transformed by the internal mechanisms of the model according to the parameters that were set in the training process. Because these summary statistics characterize the distribution of human responses that predict the state of mind of a road user pictured in the stimulus, the predicted statistics are therefore a prediction of the aggregate judgment of human observers of the state of mind of the pictured road user and thus an indirect prediction of the actual state of mind of the road user.

Figure 6:
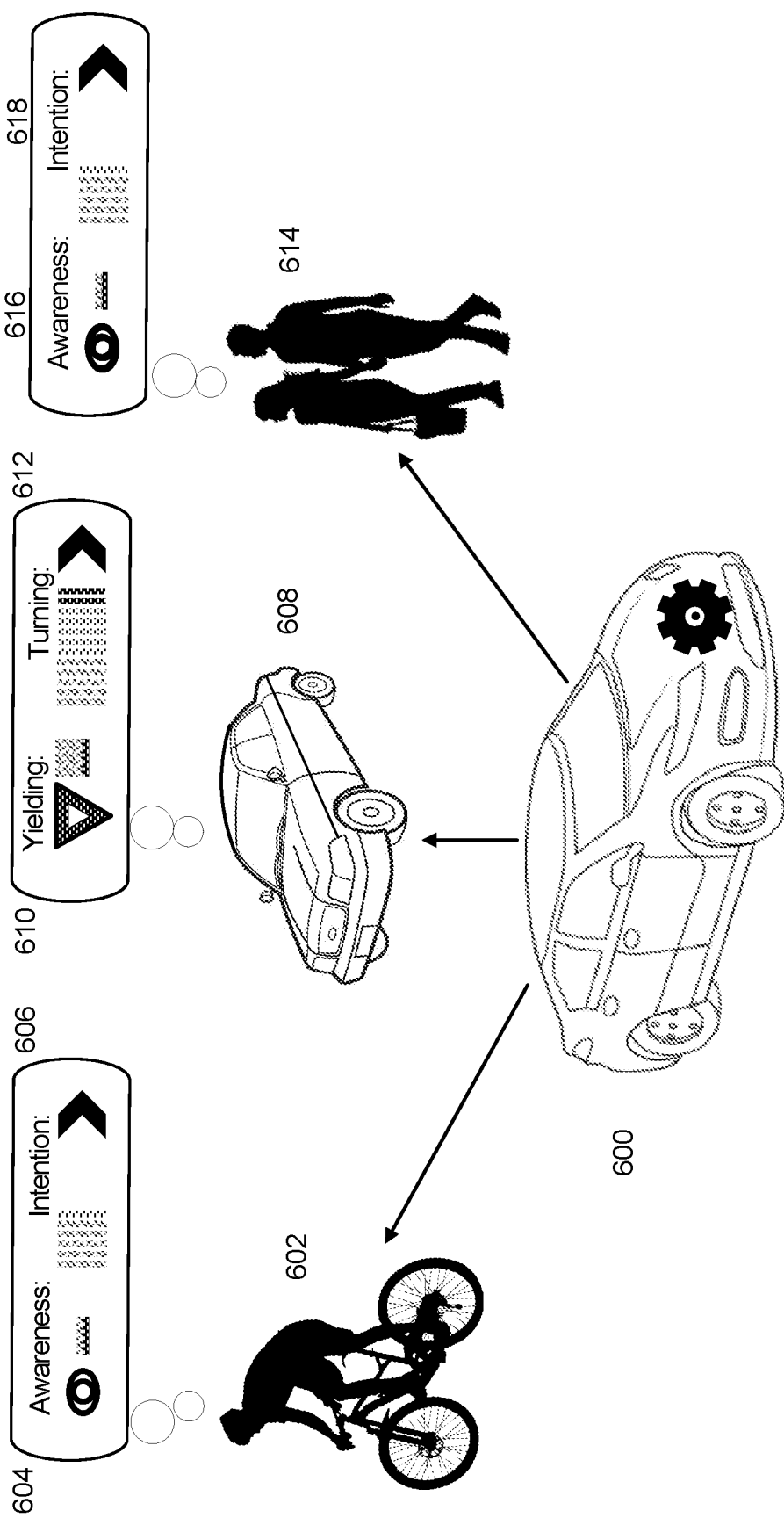
FIG. 6 is a diagram showing an example of an application of the machine learning based model for autonomous vehicles, according to some embodiments.

FIG. 6 is a diagram showing an example of an application of the machine learning based model for autonomous vehicles, according to some embodiments. In this example intention 606, 612, 618 means that the road user 602, 604, 614 has the goal of moving into the path of the vehicle 600 before the vehicle 600 (on which the system is mounted) reaches their position. Awareness 604, 610, 616 in this example means that the road user 602, 604, 614 understands that the vehicle on which the system is mounted 600 is present in their vicinity. In this example, when cyclist 602 rides into the field of view of a camera mounted on vehicle 600, the pixel data of the camera image of the cyclist is fed to a machine learning based model as described above in step 500. The machine learning based model analyzes the image as described above in step 502. The machine learning based model predicts summary statistics as in step 504. These summary statistics are an estimate of what the summary statistics would be for a collection of human observers who were shown a derived stimulus of the camera data. The estimates summary statistics are therefore the system's best answer to questions such as, is a traffic entity likely to enter the path of the vehicle. The vehicle is therefore able to make a guess 606 about the intention of the traffic entity that is closely matched to the guess that a human driver would make in that same situation. In this example, the intention of the cyclist 606 is relatively high, as indicated by the number of horizontal bars in the display. The system installed on an automobile 600 also makes predictions about the awareness 604 of cyclists of the vehicle 600, by the same method described for intention. It also makes predictions about the willingness of an automobile 608 to yield 610 or its desire to turn across the system-containing vehicle's path 612 by the same method described above. In the case of the automobile the questions that human subjects answered that would be predicted by the machine learning based model are "would the vehicle be willing to yield" 610 and "does the vehicle wish to turn across your path" 612. It also makes predictions about the desire of pedestrians 614 to cross in front of the vehicle 618, and whether those pedestrians are aware of the vehicle 616, by the same method described above.

In an embodiment, the models described above are implemented as a real-time module that predicts hidden context attributes describing behavior of traffic entities based on input from cameras or other sensors mounted on a vehicle 600. In the case of an autonomous vehicle, these predictions are used to make inferences about the intent of road users such as cyclists 602, other motorists 608, and pedestrians 614 to cross into the path of the car, as well as whether the road users are aware of the car and its future path.

Navigating Autonomous Vehicle Based on Hidden Context

Embodiments of the vehicle computing system 120 predict hidden context representing intentions and future plans of a traffic entity (e.g., a pedestrian or a bicyclist) and use the hidden context for navigating the autonomous vehicle, for example, by adjusting the path planning of the autonomous robot based on the hidden context. The modules that help navigate an autonomous vehicle are tested and developed using simulation data generated by simulation modules 310 or 320.

The vehicle computing system 120 may improve the path planning by taking a machine learning based model that predicts the level of human uncertainty about the future actions of pedestrians and cyclists and uses that as an input into the autonomous vehicle's motion planner. The training vector further includes information about the ground truth of the world obtained from more computer vision models. The vehicle computing system 120 may use the output of the prediction engine 102 to generate a probabilistic map of the risk of encountering an obstacle given different possible motion vectors at the next time step. Alternatively, the vehicle computing system 120 may use the output of the prediction engine 102 to a motion plan which incorporates the probabilistic uncertainty of the human assessment.

In an embodiment, the prediction engine 102 determines a metric representing a degree of uncertainty in human assessment of the near-term goal of a pedestrian or any user representing a traffic entity. The specific form of the representation of uncertainty is a model output that comes in the form of a probability distribution, capturing the expected distributional characteristics of human assessments of the goal and awareness state of road users. The model output may comprise the central tendency, i.e., the mean likelihood that a person will act in a certain way and one or more parameters including the variance, kurtosis, skew, heteroskedasticity, and multimodality of the predicted human distribution. These summary statistics carry information about the level of human uncertainty.

Figure 7:
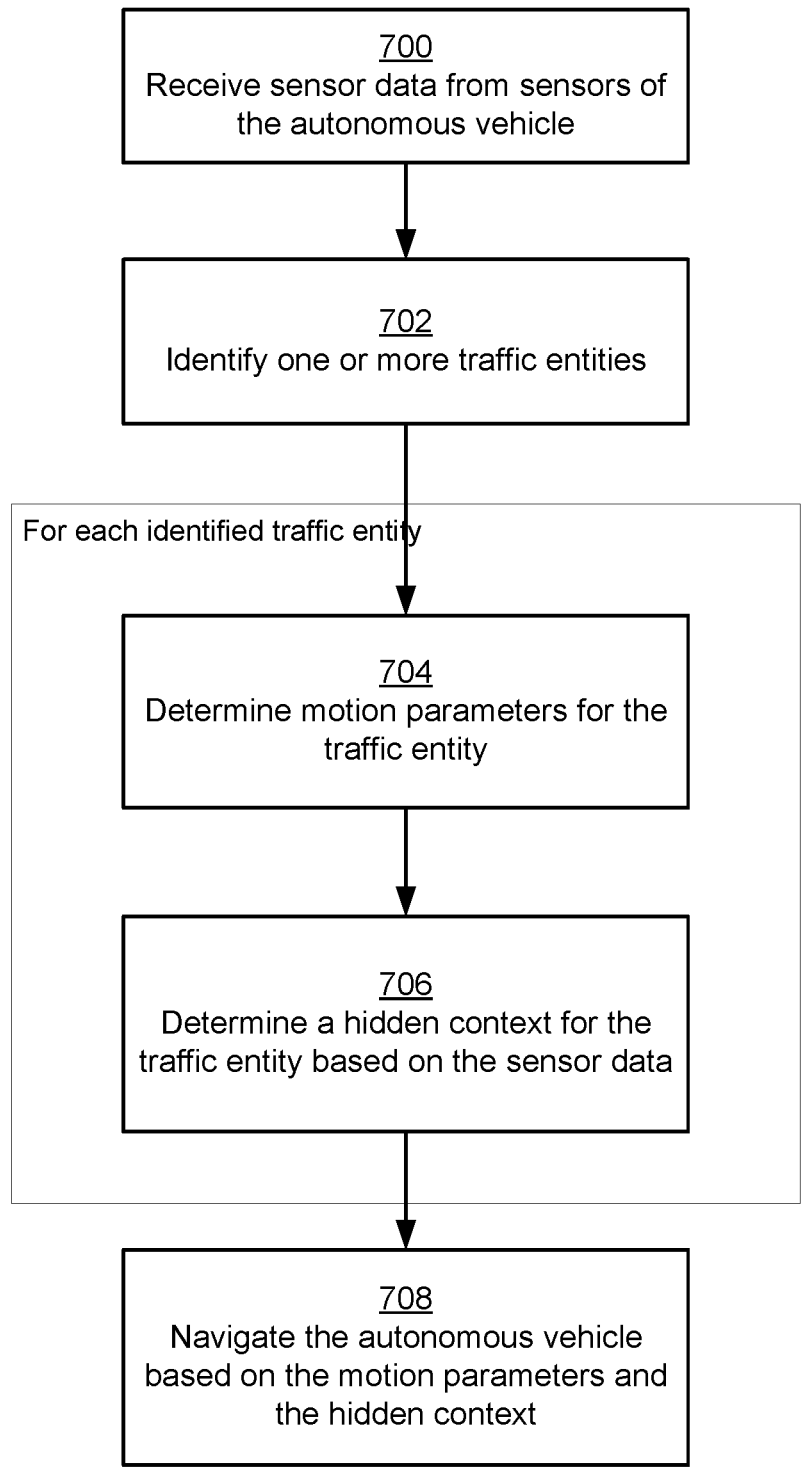
FIG. 7 represents a flowchart illustrating the process of navigating an autonomous vehicle based on hidden context information, according to some embodiments.

FIG. 7 represents a flowchart illustrating the process of navigating the autonomous vehicle based on hidden context, according to an embodiment. The steps illustrated in the flowchart may be performed in an order different from that illustrated in FIG. 7. For example, certain steps may be performed in parallel. The steps may be performed by modules other than those indicated herein.

The vehicle computing system 120 receives 700 sensor data from sensors of the autonomous vehicle. For example, the vehicle computing system 120 may receive lidar scans from lidars and camera images from cameras mounted on the autonomous vehicle. In an embodiment, the vehicle computing system 120 builds a point cloud representation of the surroundings of the autonomous vehicle based on the sensor data. The vehicle computing system 120 identifies 702 one or more traffic entities based on the sensor data, for example, pedestrians, bicyclists, or other vehicles driving in the traffic. The traffic entities represent non-stationary objects in the surroundings of the autonomous vehicle.

The vehicle computing system 120 repeats the following steps 704 and 706 for each identified traffic entity. The vehicle computing system 120 determines 704 motion parameters for the traffic entity, for example, speed and direction of movement of the traffic entity. The vehicle computing system 120 also determines 706 a hidden context associated with the traffic entity using the prediction engine 102. The hidden context may represent a state of mind of a person represented by the traffic entity. For example, the hidden context may represent a near term goal of the person represented by the traffic entity, for example, indicating that the person is likely to cross the street, or indicating that the person is likely to pick up an object (e.g., a wallet) dropped on the street but stay on that side of the street, or any other task that the person is likely to perform within a threshold time interval. The hidden context may represent a degree of awareness of the person about the autonomous vehicle, for example, whether a bicyclist driving in front of the autonomous vehicle is likely to be aware that the autonomous vehicle is behind the bicycle.

The vehicle computing system 120 navigates 708 the autonomous vehicle based on the motion parameters as well as the hidden context. For example, the vehicle computing system 120 may determine a safe distance from the traffic entity that the autonomous vehicle should maintain based on the motion parameters of the traffic entity. The vehicle computing system 120 modulates the safe distance based on the hidden context. The vehicle computing system 120 may adjust the safe distance based on whether the near-term goal of the person indicating that the person intends to reach a location in the direction of the movement of the traffic entity or in a different direction.

For example, based on the motion parameters, the motion planner 340 may determine that the autonomous vehicle can drive within X meters of the traffic entity. However, the hidden context indicates that the person represented by the traffic entity intends to cross the street in a direction different from the direction indicated by the motion parameters. In this situation, the motion planner 340 adjusts the safe distance such that the autonomous vehicle is able to drive closer to the traffic entity than the distance X. On the other hand, if the hidden context indicates that the person represented by the traffic entity intends to cross the street in a direction same as the direction indicated by the motion parameters, the motion planner 340 adjusts the safe distance such that the autonomous vehicle maintains a distance greater than X from the traffic entity.

Simulation of Non-Stationary Objects

Embodiments of the invention generate simulation environments for testing and development of autonomous vehicles. Conventional techniques for simulation environments for testing and development of autonomous vehicles fail to accurately model realistic pedestrian behaviors. Embodiments of the invention model non-stationary objects in a symbolic simulation where each symbol refers to a non-stationary object, for example, a human, a bicycle, or any moveable object. Another embodiment of the invention trains a neural network to produce kinematic or visual information about a simulated pedestrian that accurately matches the signals produced by pedestrians in the real world. The behavior of simulated pedestrians is evaluated to determine if the behavior meets characteristics of real pedestrian behavior. A non-stationary object may also be referred to as a movable object. An object in the traffic may also be referred to as an entity. The simulation environments are generated and processed using a computing system 300 that is used for performing testing and development of software modules related to autonomous vehicles. In an embodiment, the computing system 300 comprises the server 106 or comprises modules described herein as being executed by the server 106.

Symbolic Simulation of Non-Stationary Objects

The symbolic simulation module 310 generates symbolic representations of traffic scenarios including: (1) A pedestrian walking alongside a row of parked cars with no intention to cross the road, or (2) A pedestrian waiting at the edge of a road to cross the street, (3) A pedestrian walking towards a crosswalk with the intention of crossing the road, (4) A cyclist riding to the right of the autonomous vehicle with awareness of the autonomous vehicle (5) A cyclist riding to the right of the autonomous vehicle in a roundabout with no intention to exit the roundabout, (6) A motorist driving a car coming from the opposite direction in an intersection who will yield to the autonomous vehicle making a left turn across its planned path.

The symbolic simulation module 310 models scenarios such as the above, and encodes hidden context, for example, hidden context representing the states of mind of human actors (e.g., pedestrians, cyclists, other motorists) in these scenarios with parameters similar to the parameters derived by an autonomous vehicle using the prediction engine 114. The parameters may include human-annotated values for state of mind judgments such as intention and awareness.

The symbolic simulation is used to test the behavior of a motion planner including but not limited to an RRT (rapidly exploring random tree), a POMDP (partially observable Markov decision process), a Monte Carlo simulation based multi-hypothesis planner or a lattice planner, or a safety system including but not limited to an advanced emergency braking (AEB) system or an adaptive cruise control (ACC) system.

Embodiments allow a computing system 300 to simulate the behavior of a motion planner in an environment that consists of dynamic human actors. The motion planner 340 processes information describing kinematics of the objects in the scene (example: the location and speed of a pedestrian), and the context within which the objects are found (example: pedestrians within or near a crosswalk). By representing the complex states of mind of the human actors in the environment, the motion planner is able to calculate the path of the robotic system in a manner that is compatible with information contained in the states of mind of the human actors on the road. The motion planner may incorporate the information about the human state of mind either as a deterministic set of values or as a probabilistic distribution. This enables the motion planner to plan a path through dynamic environments in the vicinity of human actors smoothly and safely in scenarios similar to and including but not limited to those in various scenarios described herein.

Figure 8:
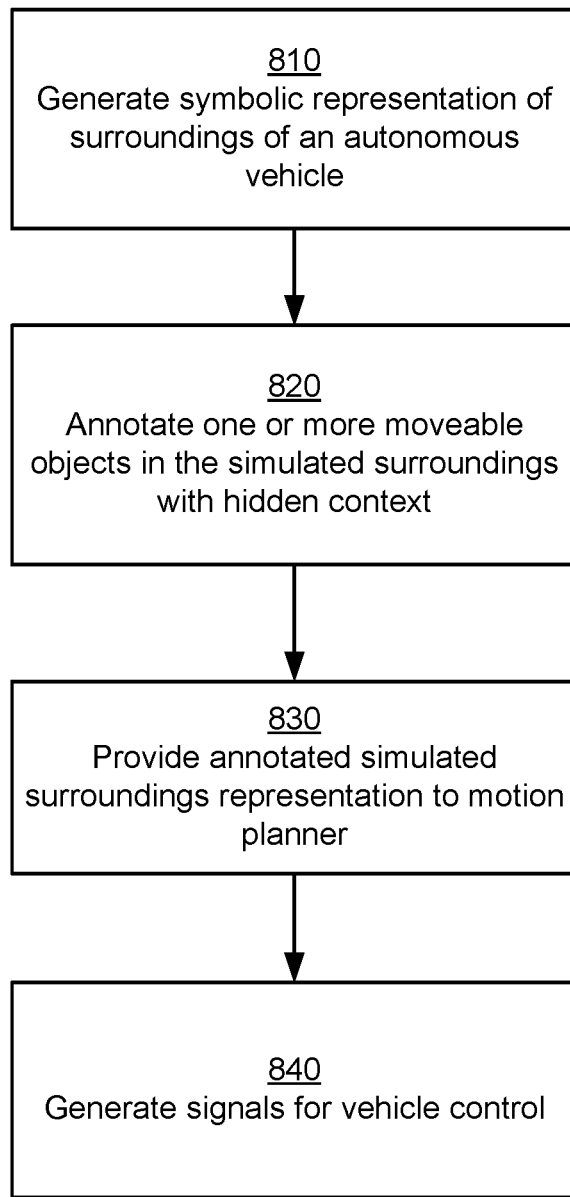
FIG. 8 represents a flowchart illustrating the process of symbolic simulation for autonomous vehicle systems, according to some embodiments.

FIG. 8 represents a flowchart illustrating the process of symbolic simulation for autonomous vehicle systems, according to an embodiment.

The symbolic simulation module 310 generates 810 a symbolic representation of each entity in the environment surrounding of the autonomous vehicle including non-stationary physical objects (e.g., pedestrians, cyclists, motorists, and so on) as well as stationary physical objects (e.g., buildings, trees, traffic signs, and so on), features of the road (e.g., lanes, cross walk, and so on.) The representation of each traffic entity may be stored as an electronic object or record comprising a data structure storing a type of the traffic entity, a position/geometric shape of the traffic entity, dimensions, information representing the motion of the traffic entity if the traffic entity is moving. The information describing the motion of a traffic entity may be specified using one or more vectors indicating a direction of movement, velocity, acceleration, and so on. The position of a traffic entity may be specified using 3D coordinates that may be relative to the autonomous vehicle or represent a position within a video frame.

The symbolic simulation module 310 annotates 820 one or more traffic entities in the simulated environment (surroundings of the autonomous vehicle) with hidden context information. The symbolic simulation module 310 annotates the traffic entity with the type of data that is generated by the machine learning based model, for example, summary statistics representing distribution of values of scores provided by human observer responses describing hidden context attribute of the traffic entity. These summary statistics include measurements of the central tendency of the distribution of scores like the mean, median, or mode. They could include measurements of the heterogeneity of the scores like variance, standard deviation, skew, kurtosis, heteroskedasticity, multimodality, or uniformness. They could also include summary statistics like those above calculated from the implicit measurements of the responses listed above.

In an embodiment, the hidden context information matches the information derived from sensor data by an autonomous vehicle using the prediction engine 114, for example, human behavior estimates for non-stationary objects in traffic, for example, road users such as pedestrians, cyclists, and other motorists. For example, in the case of pedestrians, the hidden context may comprise estimates for: (1) intention, which represents the likelihood that a pedestrian intends to perform an action in the near future, for example, cross the street, walk into the path of autonomous vehicle, step into a cross walk, and so on; and (2) awareness, which represents the likelihood that the pedestrian is aware of the presence of the autonomous vehicle. The estimates are inferred from the perspective of the autonomous vehicle.

In an embodiment, the system 110 receives a video captured by sensors mounted on a vehicle and analyzes the video frames of the video. The system 110 tracks a traffic entity across various video frames. For example, the system 110 associates traffic entities that have closely matching bounding boxes across consecutive video frames. By associating a traffic entity across a sequence of consecutive video frames, the system 110 tracks the traffic entity over a time interval of the video. The symbolic simulation module 310 may annotate a traffic entity with different hidden context information in different frames. For example, the symbolic simulation module 310 may associate the traffic entity with different summary statistics values. The symbolic simulation module 310 may generate the summary statistics values for annotating a traffic entity through random number generation within a range of values for the type of summary statistics being generated.

In an embodiment, the symbolic simulation module 310 annotates the video frames so that hidden context attribute values have smooth transition across consecutive video frames. Assume that a traffic entity E1 is identified in the video across a time interval starting from time t1 to time t2 in the video (assuming the video starts at time t0 start time). In an embodiment, the symbolic simulation module 310 annotates the traffic entity E1 with hidden context attribute value V1 at time t1 and value V2 at time T2. The symbolic simulation module 310 annotates the traffic entity E1 at time points between t1 and t2 with values obtained via interpolation of values V1 and V2, for example, using linear interpolation so that the hidden context attribute values change linearly from t1 to t2 through the video frames.

The computing system 300 provides 830 the annotated simulated environment representation to the motion planner 340 as input. The motion planner 340 uses the simulated environment representation for generating a motion plan for a simulated autonomous vehicle or an actual autonomous vehicle being used in a test environment. The vehicle controls module 350 generates 840 the required signals for controlling the autonomous vehicle based on the motion plan generated by the motion planner 340. The simulation data is used in a simulation environment for testing or development of the motion planner or any other module comprising instructions used by an autonomous vehicle while driving through traffic.

GAN Based Simulation

In an embodiment, the computing system 300 performs imitation learning to transfer the generated hidden context parameters or human annotated hidden context parameters from real world situations into the simulation environment. In an embodiment, the computing system 300 uses generative adversarial networks (GAN) for improving the symbolic simulation representation. For example, the computing system 300 uses model outputs as the discriminator in a generative adversarial network framework to improve the generation of realistic pedestrians for simulation, which are subsequently used to derive the hidden context parameters. The computing system 300 may use other algorithmic means of encoding the behavior of the human actors represented through hidden context parameters.

The GAN based simulation module 320 uses the prediction engine 114 as the discriminator in a generative adversarial network framework to improve the generation of realistic pedestrians for simulation and testing environments. As described in conjunction with the symbolic simulation module 210, the GAN based simulation module 320 may generate simulations of realistic pedestrians or other traffic entities for a variety of traffic scenarios. In some embodiments, the GAN based simulation module 320 comprises a rendering engine or another model configured to receive a feature vector as input and to generate simulation data including traffic entities based on the feature vectors as output.

Figure 9:
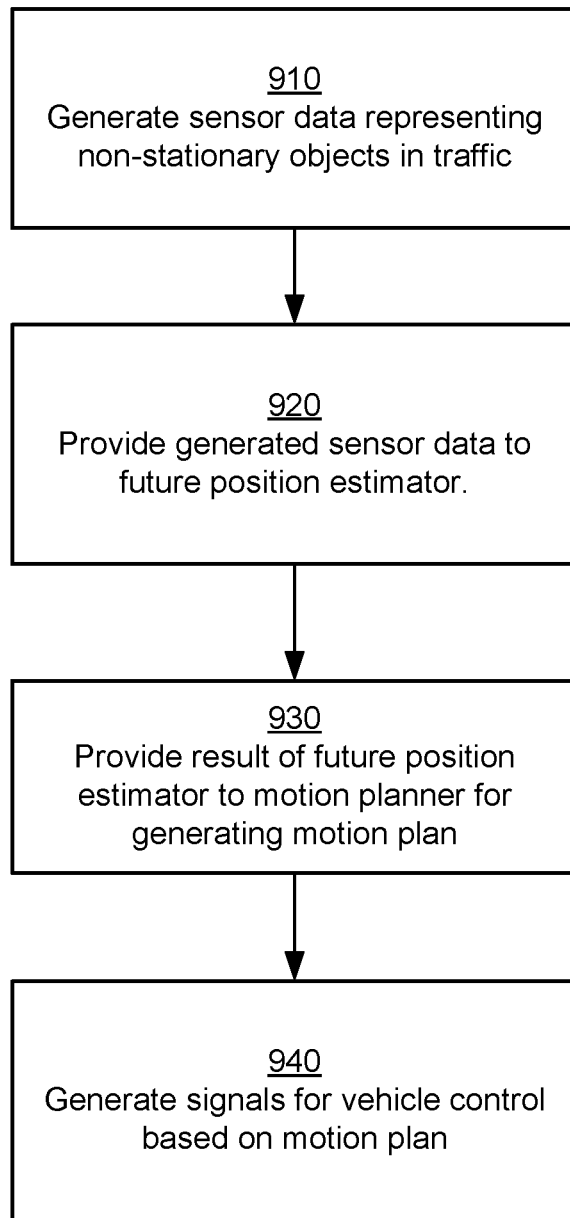
FIG. 9 represents a flowchart illustrating the process of GAN based simulation for autonomous vehicle systems, according to some embodiments.

FIG. 9 represents a flowchart illustrating the process of GAN based simulation for autonomous vehicle systems, according to an embodiment.

The GAN based simulation module 320 generates 910 sensor data representing non-stationary objects in traffic using following multi-stage process. In an embodiment, the GAN based simulation module invokes the rendering engine 360 for generating sensor data, for example, images including traffic entities having certain n characteristics specified using a feature vector.

The GAN based simulation module 320 generates a path for non-stationary object, for example, a path through a crosswalk on a street causing the non-stationary object to cross the street via the crosswalk. The GAN based simulation module 320 generates a model with appropriate kinematic characteristics to follow that path. In an embodiment, the GAN based simulation module 320 uses predefined models for different types of non-stationary objects based on their real-world characteristics, for example, a model may represent a pedestrian, another model may represent a bicyclist, and so on. The GAN based simulation module 320 invokes the rendering engine 360 to render a non-stationary object model for a traffic entity by applying texture and environmental characteristics in the simulation's rendering environment. For example, the GAN based simulation module 320 assigns a position for the traffic entity, for example, a position for a pedestrian on the side walk. The GAN based simulation module 320 assigns an orientation for the traffic entity, for example, the orientation specifying the direction that the pedestrian is facing.

The GAN based simulation module 320 invokes the rendering engine 360 that uses predefined rendering characteristics of different non-stationary objects given their orientation and location with respect to the autonomous vehicle to render the non-stationary objects. Both the kinematic modeling and the rendering engine provide opportunities to manipulate the generated product. For example, the GAN based simulation module 320 may use different speeds at which a pedestrian can walk or different orientations for the pedestrian when the pedestrian starts walking. The GAN based simulation module 320 generates sensor data from the rendered models of the non-stationary object.

The GAN based simulation module 320 provides the generated sensor data as input to the future position estimator 330. The future position estimator 330 estimates the future position of the non-stationary object based on the sensor data and provides 930 the estimated future position of the non-stationary object to the motion planner 340. The motion planner 340 generates a motion plan based on the estimated future position of the non-stationary object. The vehicle controls module generates 940 signals for the vehicle control based on the generated motion plan, similarly to step 840 of FIG. 8.

Figure 10:
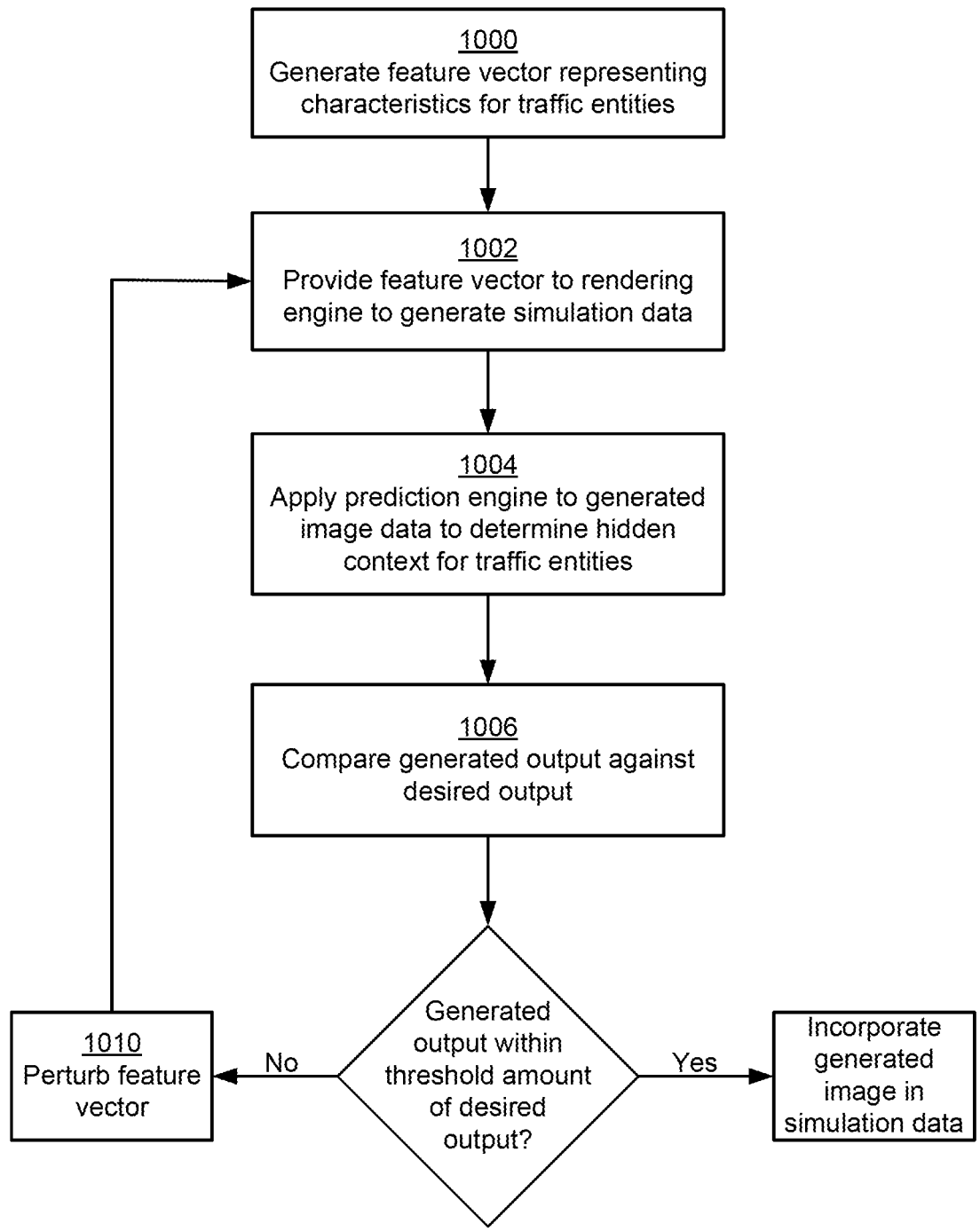
FIG. 10 represents a flowchart illustrating the process for comparing an output of a rendering engine against the prediction engine 144 for the GAN based simulation process, according to some embodiments.

FIG. 10 represents a flowchart illustrating the process for comparing an output of a rendering engine against the prediction engine 144 for the GAN based simulation process, according to some embodiments.

For a given scenario path (e.g., a pedestrian who wishes to cross the street in front of a car, and then does so), the GAN based simulation module 320 generates 1000 a feature vector. The feature vector represents characteristics for a set of traffic entities for the scenario. For example, the feature vector describes characteristics for the pedestrian wishing to cross the street, such as posture, orientation, walking speed, motions, expressions, and the like. The GAN based simulation module 320 provides 1002 the feature vector to the rendering engine to generate simulation data, such as image or video data, that includes the set of traffic entities with characteristics described by the feature vector.

The GAN based simulation module 320 applies 1004 the prediction engine 114 or another prediction model configured to determine hidden context for traffic entities to the generated simulation data. The output of the prediction engine 114 based on the simulation data from the GAN based model is compared 1006 to a desired output. In some embodiments, the desired output is determined based on data from a large set of real-world scenes which match the defined scenario characteristics collected with sensors of autonomous vehicles. In other embodiments, the desired output is a determined value or set of values for statistical information describing the hidden context of one or more traffic entities. For example, in cases where the simulation data describes scenarios where real-world scenes are not available, the desired output of the prediction engine 114 may be manually determined or set.

Responsive to the generated output from the prediction engine 114 diverging from the desired output by more than a threshold amount, the GAN based simulation module 320 iteratively performs steps of perturbing 1010 the feature vector to modify one or more parameters for the feature vector, providing 1002 the perturbed feature vector to the rendering engine to update the simulation data, applying 1004 the prediction engine 114 to the updated simulation data, and comparing 1006 the output generated by the prediction engine 114 to the desired output. In an embodiment, the GAN based simulation module 320 perturbs the feature vector by accessing and sampling from a parameter space of the feature vector to obtain a stochastically generated gradient of the GAN based model performance. The gradient is used to resample one or more parameters (for example, the kinematic or rendering parameters) from the parameter space. For example, the GAN based simulation module 320 resamples one or more parameters of the feature vector used for rendering the image comprising the traffic entity to cause the error between the generated output and the desired output to move towards a local or global minimum. Accordingly, the GAN based simulation module 320 uses gradient descent to determine the feature vector for rendering an image of a traffic entity that meets a target hidden context attribute value. In an embodiment, the target hidden content attribute is provided as input parameter of the feature vector used for generating the image of the traffic entity.

Responsive to the generated output from the prediction engine 114 being within a threshold amount of the desired output, the GAN based simulation module 320 incorporates the generated image in the simulation data. The GAN based simulation module 320 may provide the generated output to a motion planner 340 for the autonomous vehicle for testing or development of the motion planner in a simulated environment. As described in conjunction with FIG. 8, the motion planner 340 uses the simulated environment representation for generating a motion plan for a simulated autonomous vehicle or an actual autonomous vehicle being used in a test environment. The vehicle controls module 350 generates the required signals for controlling the autonomous vehicle based on the motion plan generated by the motion planner 340.

In some embodiments, as noted previously, the GAN based model may be used to produce novel scenes and scenarios in simulation with some guarantee of reasonable fidelity to the relevant feature characteristics of real scenes, as defined by the prediction engine 114 output. This enables the computing system 110 to test outputs from the motion planner 340 and vehicle controls module 350 for scenarios that do not have associated real-world scenes collected by sensors of autonomous vehicles, such as high-risk or otherwise unlikely scenarios.

The motion planner 340 is configured to use the hidden context attribute values for generating the motion plan. For example, the motion planner may generate different motion plan depending on whether a pedestrian is predicted by the prediction engine to have a highly likelihood of crossing the street in front of the autonomous vehicle compared to a pedestrian predicted to have very small likelihood of crossing the street in front of the autonomous vehicle even though the pedestrian in the two scenarios may have the same motion vector describing the physical movement of the pedestrian. Similarly, the control signals generated for controlling the autonomous vehicle in the two scenarios are different. For example, the autonomous vehicle may use automatic braking system to suddenly slow down the vehicle in the scenario in which the pedestrian is predicted by the prediction engine to have a highly likelihood of crossing the street in front of the autonomous vehicle. On the other hand, the autonomous vehicle may continue driving at a normal speed in the scenario in which the pedestrian is predicted by the prediction engine to have a small likelihood of crossing the street in front of the autonomous vehicle.

Computing Machine Architecture

Figure 11:
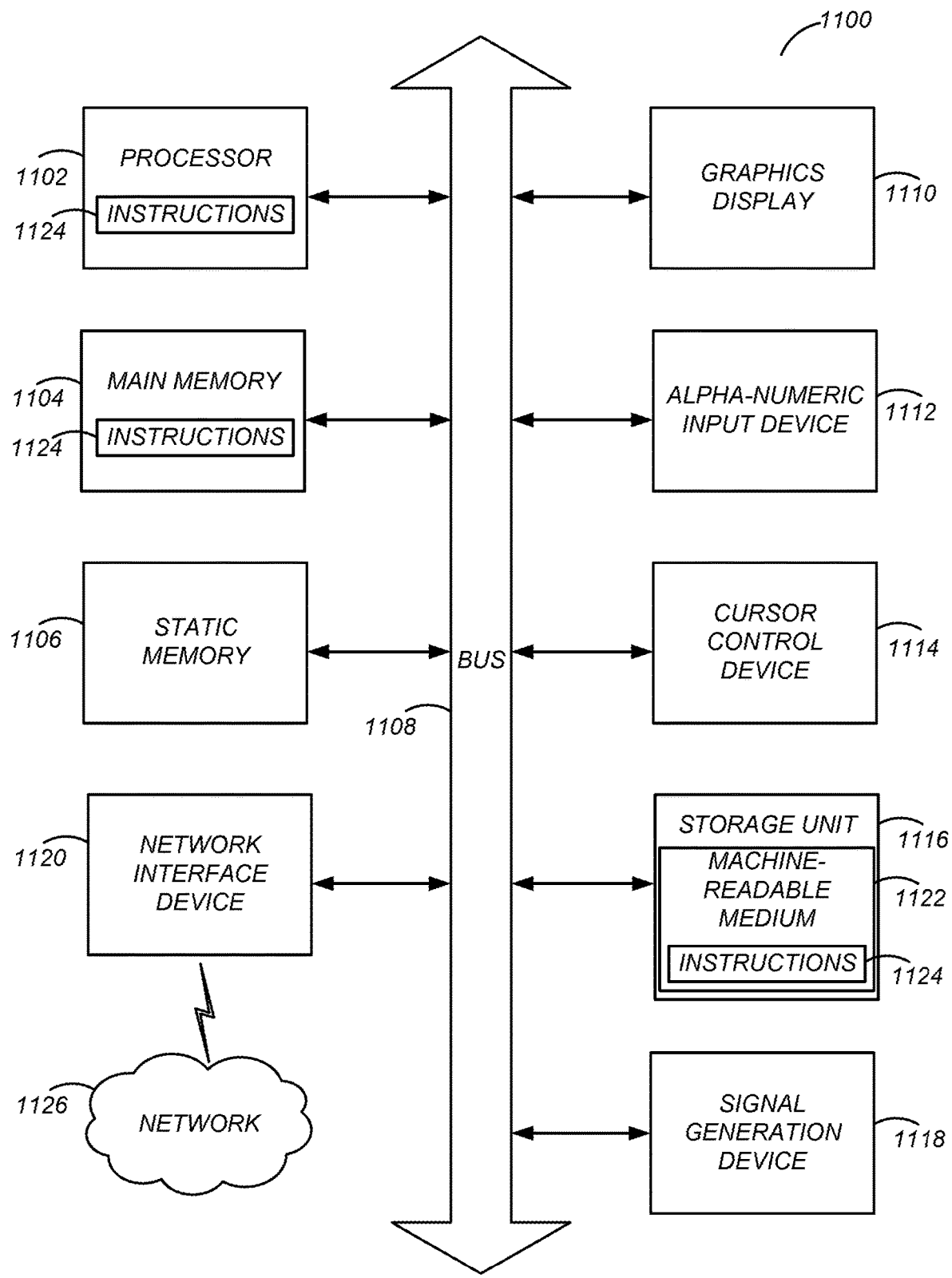
FIG. 11 is a block diagram illustrating components of an example machine able to read instructions from a machine-readable medium and execute them in a processor (or controller).

FIG. 11 is a block diagram illustrating components of an example machine able to read instructions from a machine-readable medium and execute them in a processor (or controller). Specifically, FIG. 11 shows a diagrammatic representation of a machine in the example form of a computer system 1100 within which instructions 1124 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1124 (sequential or otherwise) that specify actions to be taken by that machine. Further, while only a single machine is illustrated, the term "machine" shall also be taken to include any collection of machines that individually or jointly execute instructions 1124 to perform any one or more of the methodologies discussed herein.

The example computer system 1100 includes a processor 1102 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1104, and a static memory 1106, which are configured to communicate with each other via a bus 1108. The computer system 1100 may further include graphics display unit 1110 (e.g., a plasma display panel (PDP), a liquid crystal display (LCD), a projector, or a cathode ray tube (CRT)). The computer system 1100 may also include alphanumeric input device 1112 (e.g., a keyboard), a cursor control device 1114 (e.g., a mouse, a trackball, a joystick, a motion sensor, or other pointing instrument), a storage unit 1116, a signal generation device 1118 (e.g., a speaker), and a network interface device 1120, which also are configured to communicate via the bus 1108.

The storage unit 1116 includes a machine-readable medium 1122 on which is stored instructions 1124 (e.g., software) embodying any one or more of the methodologies or functions described herein. The instructions 1124 (e.g., software) may also reside, completely or at least partially, within the main memory 1104 or within the processor 1102 (e.g., within a processor's cache memory) during execution thereof by the computer system 1100, the main memory 1104 and the processor 1102 also constituting machine-readable media. The instructions 1124 (e.g., software) may be transmitted or received over a network 1126 via the network interface device 1120.

While machine-readable medium 1122 is shown in an example embodiment to be a single medium, the term "machine-readable medium" should be taken to include a single medium or multiple media (e.g., a centralized or distributed database, or associated caches and servers) able to store instructions (e.g., instructions 1124). The term "machine-readable medium" shall also be taken to include any medium that is capable of storing instructions (e.g., instructions 1124) for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device) or in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back-end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

We claim:

1. A computer-implemented method comprising:
   generating a representation of surroundings of an autonomous vehicle as the autonomous vehicle drives through traffic, the representation comprising symbolic representations of stationary objects and one or more road users in the traffic in which the autonomous vehicle is driving;
   annotating symbolic representation of a road user with statistical information describing a state of mind of the road user, wherein at least some of the statistical information comprises numbers generated randomly from a predetermined range of summary statistic values, the statistical information representing an expected distribution of user responses describing the state of mind of the road user, wherein a user response represents a response of a human observer presented with information describing the traffic including the road user;
   providing in a simulated environment, the symbolic representation as input to a motion planner for executing the motion planner in a simulated environment, the motion planner configured to adjust motion of a simulated autonomous vehicle; and
   testing the motion planner by generating a motion plan for the simulated autonomous vehicle used in a test environment.

2. The method of claim 1, wherein the representation of surroundings of the autonomous vehicle is obtained from a video captured by sensors mounted on the autonomous vehicle when the autonomous vehicle drives through traffic, the representation of surrounding of the autonomous vehicle comprising a sequence of video frames of the video.

3. The method of claim 1, further comprising:
   identifying a road user present in the representation during a time interval between a start time point and an end time point; and
   associating the road user with different statistical information at different time points.

4. The method of claim 3, wherein the time interval is between a start time point and an end time point, the method further comprising:
   associating the road user with a first set of values representing statistical information at the start time point and a second set of values representing statistical information at the end time point; and
   determining sets of values representing statistical information for time points between the start time point and the end time point by interpolating using the first set of values and the second set of values.

5. The method of claim 1, wherein the state of mind represents a task that the road user is planning on accomplishing.

6. The method of claim 1, wherein the state of mind represents a degree of awareness of the autonomous vehicle by the road user.

7. The method of claim 1, wherein the state of mind represents a goal of the road user, wherein the road user expects to achieve the goal within a threshold time interval.

8. The method of claim 1, further comprising, testing navigation of the simulated autonomous vehicle by:
   generating signals for controlling the autonomous vehicle based on the state of mind of each road user; and
   sending the generated signals to controls of the autonomous vehicle.

9. A non-transitory computer readable storage medium storing instructions that when executed by a computer processor, cause the computer processor to perform steps comprising:
   generating a representation of surroundings of an autonomous vehicle as the autonomous vehicle drives through traffic, the representation comprising symbolic representations of stationary objects and one or more road users in the traffic in which the autonomous vehicle is driving;
   annotating symbolic representation of a road user with statistical information describing a state of mind of the road user, wherein at least some of the statistical information comprises numbers generated randomly from a predetermined range of summary statistic values, the statistical information representing an expected distribution of user responses describing the state of mind of the road user, wherein a user response represents a response of a human observer presented with information describing the traffic including the road user;
   providing in a simulated environment, the symbolic representation as input to a motion planner for executing the motion planner in a simulated environment, the motion planner configured to adjust motion of a simulated autonomous vehicle according to a state of mind of a road user encountered by the autonomous vehicle while driving in traffic; and
   testing the motion planner by generating a motion plan for the simulated autonomous vehicle in a test environment.

10. The non-transitory computer readable storage medium of claim 9, wherein the representation of surroundings of the autonomous vehicle is obtained from a video captured by sensors mounted on the autonomous vehicle when the autonomous vehicle drives through traffic, the representation of surrounding of the autonomous vehicle comprising a sequence of video frames of the video.

11. The non-transitory computer readable storage medium of claim 9, wherein the instructions further cause the computer processor to perform steps comprising:
   identifying a road user present in the representation during a time interval between a start time point and an end time point; and
   associating the road user with different statistical information at different time points.

12. The non-transitory computer readable storage medium of claim 11, wherein the time interval is between a start time point and an end time point, wherein the instructions further cause the computer processor to perform steps comprising:
- associating the road user with a first set of values representing statistical information at the start time point and a second set of values representing statistical information at the end time point; and
- determining sets of values representing statistical information for time points between the start time point and the end time point by interpolating using the first set of values and the second set of values.

13. The non-transitory computer readable storage medium of claim 9, wherein the state of mind represents a task that the road user is planning on accomplishing.

14. The non-transitory computer readable storage medium of claim 9, wherein the state of mind represents a degree of awareness of the autonomous vehicle by the road user.

15. The non-transitory computer readable storage medium of claim 9, wherein the state of mind represents a goal of the road user, wherein the road user expects to achieve the goal within a threshold time interval.

16. The non-transitory computer readable storage medium of claim 9, further storing instructions that when executed by the computer processor, cause the computer processor to perform steps comprising navigation of the simulated autonomous vehicle by:
- generating signals for controlling the autonomous vehicle based on the state of mind of each road user; and
- sending the generated signals to controls of the autonomous vehicle.

17. A computer system comprising:
- a computer processor; and
- a non-transitory computer readable storage medium storing instructions that when executed by the computer processor, cause the computer processor to perform steps comprising:
  - generating a representation of surroundings of an autonomous vehicle as the autonomous vehicle drives through traffic, the representation comprising symbolic representations of stationary objects and one or more road users in the traffic in which the autonomous vehicle is driving;
  - annotating symbolic representation of a road user with statistical information describing a state of mind of the road user, wherein at least some of the statistical information comprises numbers generated randomly from a predetermined range of summary statistic values, the statistical information representing an expected distribution of user responses describing the state of mind of the road user, wherein a user response represents a response of a human observer presented with information describing the traffic including the road user;
  - providing in a simulated environment, the symbolic representation as input to a motion planner for executing the motion planner in a simulated environment, the motion planner configured to adjust motion of a simulated autonomous vehicle according to a state of mind of a road user encountered by the autonomous vehicle while driving in traffic; and
  - testing the motion planner by generating a motion plan for the simulated autonomous vehicle in a test environment.

18. The computer system of claim 17, wherein the instructions further cause the computer processor to perform steps comprising:
- identifying a road user present in the representation during a time interval between a start time point and an end time point; and
- associating the road user with different statistical information at different time points.

19. The computer system of claim 18, wherein the time interval is between a start time point and an end time point, wherein the instructions further cause the computer processor to perform steps comprising:
- associating the road user with a first set of values representing statistical information at the start time point and a second set of values representing statistical information at the end time point; and
- determining sets of values representing statistical information for time points between the start time point and the end time point by interpolating using the first set of values and the second set of values.

* * * * *